US009706537B2

(12) United States Patent
Lee

(10) Patent No.: US 9,706,537 B2
(45) Date of Patent: Jul. 11, 2017

(54) METHOD OF HANDLING HARQ FEEDBACKS AND RELATED COMMUNICATION DEVICE

(71) Applicant: Industrial Technology Research Institute, Hsinchu (TW)

(72) Inventor: Chien-Min Lee, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 150 days.

(21) Appl. No.: 14/326,477

(22) Filed: Jul. 9, 2014

(65) Prior Publication Data
US 2015/0016353 A1  Jan. 15, 2015

Related U.S. Application Data

(60) Provisional application No. 61/844,521, filed on Jul. 10, 2013.

(51) Int. Cl.
*H04W 4/00* (2009.01)
*H04W 72/04* (2009.01)
*H04L 1/18* (2006.01)
*H04L 5/00* (2006.01)
*H04L 1/00* (2006.01)

(52) U.S. Cl.
CPC ......... *H04W 72/042* (2013.01); *H04L 1/1812* (2013.01); *H04L 1/1854* (2013.01); *H04L 1/1887* (2013.01); *H04L 5/0055* (2013.01); *H04L 1/1861* (2013.01); *H04L 2001/0093* (2013.01)

(58) Field of Classification Search
None
See application file for complete search history.

(56) References Cited

U.S. PATENT DOCUMENTS

| | | |
|---|---|---|
| 2011/0110246 A1 | 5/2011 | Damnjanovic |
| 2011/0116455 A1 | 5/2011 | Damnjanovic |
| 2011/0199975 A1 | 8/2011 | Wu |
| 2011/0243066 A1 | 10/2011 | Nayeb |
| 2012/0113831 A1 | 5/2012 | Pelletier |
| 2012/0176978 A1 | 7/2012 | Kim |
| 2013/0114524 A1 | 5/2013 | Sirotkin |
| 2013/0242814 A1 * | 9/2013 | Wang .................... H04L 1/1861 370/280 |
| 2014/0056278 A1 | 2/2014 | Marinier |
| 2014/0177539 A1 | 6/2014 | Novak |

(Continued)

FOREIGN PATENT DOCUMENTS

| | | | |
|---|---|---|---|
| CA | WO 2013022751 A1 * | 2/2013 | ........... H04L 1/1607 |
| TW | 201004209 | 1/2010 | |

(Continued)

*Primary Examiner* — Maharishi Khirodhar
(74) *Attorney, Agent, or Firm* — Winston Hsu

(57) ABSTRACT

A method of transmitting HARQ feedbacks for a communication device comprises transmitting at least one first HARQ feedback triggered by at least one first DL packet to a primary base station, wherein the at least one first DL packet is transmitted by a first base station to the communication device; and dropping at least one second HARQ feedback triggered by at least one second DL packet, wherein the at least one second DL packet is transmitted by a second base station to the communication device.

11 Claims, 7 Drawing Sheets

(56) References Cited

U.S. PATENT DOCUMENTS

2014/0192740 A1* 7/2014 Ekpenyong ........... H04L 5/0035
                                                                370/329
2014/0321406 A1   10/2014 Marinier
2015/0043394 A1    2/2015 Lin
2015/0249980 A1*  9/2015 You ....................... H04L 1/1861
                                                                370/329

FOREIGN PATENT DOCUMENTS

| TW | 201316732 | 4/2013 |
| TW | 201320676 | 5/2013 |
| WO | 2010082720 A1 | 7/2010 |
| WO | 2011041623 A1 | 4/2011 |
| WO | 2011055238 A1 | 5/2011 |
| WO | 2013022751 A1 | 2/2013 |

* cited by examiner

1

METHOD OF HANDLING HARQ FEEDBACKS AND RELATED COMMUNICATION DEVICE

CROSS REFERENCE TO RELATED APPLICATIONS

This application claims the benefit of U.S. Provisional Application No. 61/844,521, filed on Jul. 10, 2013 and incorporated herein by reference.

BACKGROUND OF THE INVENTION

1. Field of the Invention

The present invention relates to a method used in a wireless communication system and related communication device, and more particularly, to a method of handling hybrid automatic repeat request (HARQ) feedbacks in a wireless communication system and related communication device.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (COMP) transmission/reception, uplink multiple-input multiple-output (UL-MIMO), etc. For a UE and an eNB to communicate with each other in the LTE-A system, the UE and the eNB must support standards developed for the LTE-A system, such as the 3GPP Rel-10 standard or later versions.

The UE may receive packets (e.g., transport blocks (TBs)) transmitted by two eNBs, e.g., NB1-NB2, when the UE is configured with the dual connectivity. The UE needs to transmit hybrid automatic repeat request (HARQ) feedbacks corresponding to the packets to the eNBs NB1-NB2, to acknowledge the reception of the packets. For example, the UE may transmit the HARQ feedbacks to the eNB NB1, and the HARQ feedbacks corresponding to the packets transmitted by the eNB NB2 may be forwarded by the eNB NB1 to the eNB NB2. However, a backhaul (e.g., X2 interface) connected between the eNBs NB1-NB2 may not be ideal, e.g., a delay caused by the backhaul to a transmission on the backhaul is large. In addition, resource for transmitting the HARQ feedbacks may depend on resource information which is only available at the eNB NB2. Thus, the eNB NB1 may not be able to transmit the HARQ feedbacks to the eNB NB2 via backhaul correctly, and the eNB NB2 may not operate regularly due to the delayed HARQ feedbacks. For example, the eNB NB2 may determine that the packets are not received correctly by the UE, and the eNB NB2 retransmits the packets to the UE. In this situation, not only throughput of the UE is degraded, but the UE cannot operate regularly due to wrong retransmissions of the packets.

Thus, it is important to mitigate or even eliminate the effect of the non-ideal backhaul between the eNBs, for the eNBs to receive the HARQ feedbacks immediately.

SUMMARY OF THE INVENTION

The present invention therefore provides a method and related communication device for handling HARQ feedbacks to solve the abovementioned problem.

A method of transmitting HARQ feedbacks for a communication device comprises transmitting at least one first HARQ feedback triggered by at least one first DL packet to a primary base station, wherein the at least one first DL packet is transmitted by a first base station to the communication device; and dropping at least one second HARQ feedback triggered by at least one second DL packet, wherein the at least one second DL packet is transmitted by a second base station to the communication device.

A method of transmitting HARQ feedbacks for a communication device comprises determining a first number of HARQ resource for at least one first HARQ feedback according to a downlink (DL) assignment index ($DAI_{UL}$) of a corresponding uplink (UL) grant or according to a first maximum number of HARQ resource, wherein at least one first DL packet triggering the at least one first HARQ feedback is transmitted by a first base station to the communication device; determining a second number of HARQ resource for at least one second HARQ feedback triggered by at least one second DL packet, wherein the at least one second DL packet is transmitted by a second base station to the communication device; and determining at least one HARQ resource of a physical UL shred channel (PUSCH) according to the first number of HARQ resource and the second number of HARQ resource, to transmit the at least one first HARQ feedback and the at least one second HARQ feedback via the at least one HARQ resource.

A method of receiving hybrid automatic repeat request (HARQ) feedbacks for a first base station comprises exchanging first resource information for at least one first HARQ feedback transmitted by a first communication device with a second base station; and detecting the at least one first HARQ feedback according to the first resource information, wherein the at least one first HARQ feedback is triggered, by at least one downlink (DL) packet transmitted by the first base station, the second base station or both the first base station and the second base station to the communication device.

A method of transmitting hybrid automatic repeat request (HARQ) feedbacks for a communication device comprises receiving a plurality of resource indices and a plurality of subframe index groups which correspond to the plurality of resource indices, respectively; and transmitting at least one HARQ feedback to a first base station according to one of the plurality of resource indices and a corresponding one of the plurality of subframe index groups, wherein the at least one HARQ feedback is triggered, by at least one downlink (DL) packet transmitted by the first base station, a second base station or both the first base station and the second base station.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
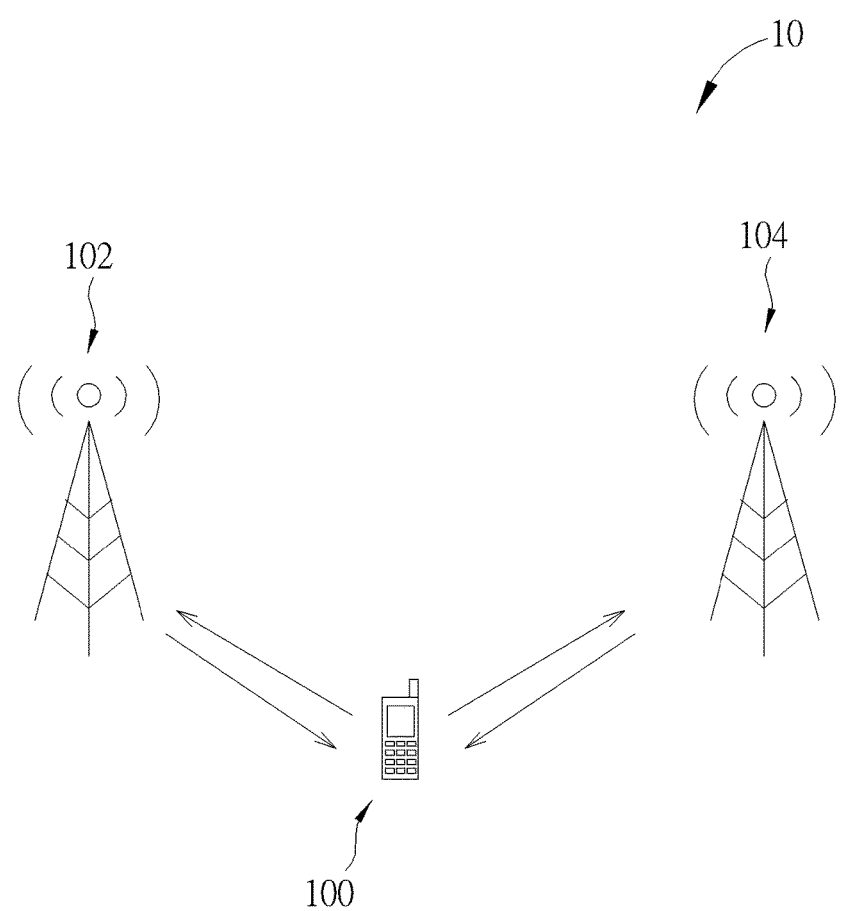
FIG. 1 is a schematic diagram of a wireless communication system according to an example of the present invention.

FIG. 1 is a schematic diagram of a wireless communication system 10 according to an example of the present invention. The wireless communication system 10 is briefly composed of a user equipment (UE) 100 and base stations (BSs) 102 and 104. In FIG. 1, the UE 100, the BSs 102 and 104 and are simply utilized for illustrating the structure of the wireless communication system 10. Practically, the BS 102 and/or the BS 104 may be an evolved NB (eNB) and/or a relay station in an evolved UTRAN (E-UTRAN), a long term evolution (LTE) system, a LTE-Advanced (LTE-A) system or an evolution of the LTE-A system. The wireless communication system 10 may be a time-division duplexing (TDD) system (i.e., the TDD is operated) or a frequency-division duplexing (FDD) system (i.e., the FDD is operated). In FIG. 1, coverage areas of the BS 102 and the BS 104 may be partly overlapped.

As shown in FIG. 1, the UE 100 may communicate with the BS 102 and the BS 104 at the same time according to dual connectivity configured to the UE 100. That is, the UE 100 may perform a transmission/reception via both the BSs 102 and 104. For example, the UE 100 may receive packets (e.g., transport blocks (TBS)) from the BSs 102 and 104 according to the dual connectivity, or the UE 100 may transmit packets (e.g., TBs) to the BSs 102 and 104 according to the dual connectivity. In general, it means that the UE 100 receives the packets from at least one cell of the BS 102 and at least one cell of the BS 104 according to the dual connectivity, when the UE 100 receives the packets from both the BSs 102 and 104. Similarly, it means that the UE 100 transmits the packets to at least one cell of the BS 102 and/or at least one cell of the BS 104 according to the dual connectivity, when the UE 100 transmits the packets to both the BSs 102 and 104. In addition, one of the cells communicating with the UE 100 may be a primary cell (e.g., UL carrier for transmitting hybrid automatic repeat request (HARQ)), and the other cell(s) may be secondary cell(s).

The UE 100 may be a machine type communication (MTC) device, a mobile phone, a laptop, a tablet computer, an electronic book or a portable computer system. In addition, the UE 100, the BS 102 or the BS 104 may be seen as a transmitter or a receiver according to its transmission direction, e.g., for an uplink (UL), the UE 100 is the transmitter and the BS 102 and/or the BS 104 is the receiver, and for a downlink (DL), the BS 102 and/or the BS 104 is the transmitter and the UE 100 is the receiver.

Figure 2:
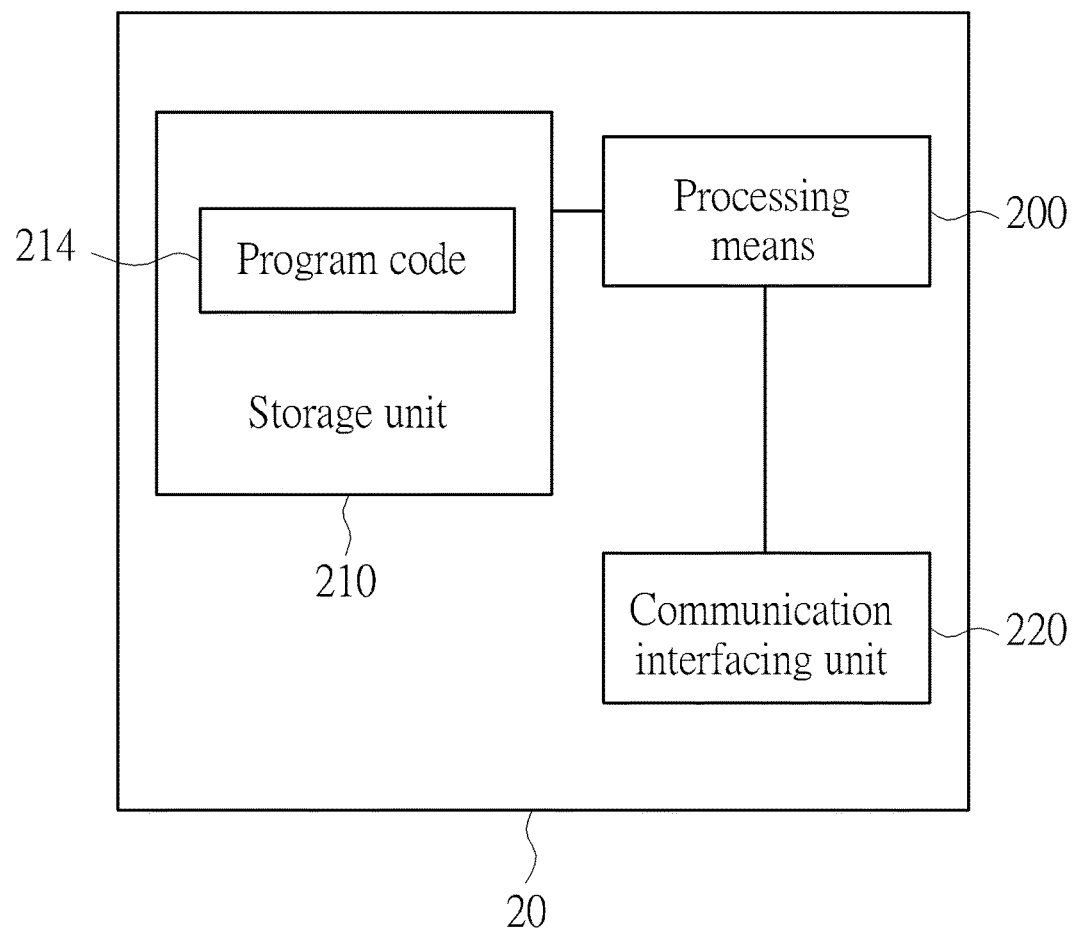
FIG. 2 is a schematic diagram of a communication device according to an example of the present invention.

FIG. 2 is a schematic diagram of a communication device 20 according to an example of the present invention. The communication device 20 may be the UE 100, the BS 102 and/or the BS 104 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 220 is preferably a transceiver and is used to transmit and receive signals (e.g., data, signals, messages and/or packets) according to processing results of the processing means 200.

Figure 3:
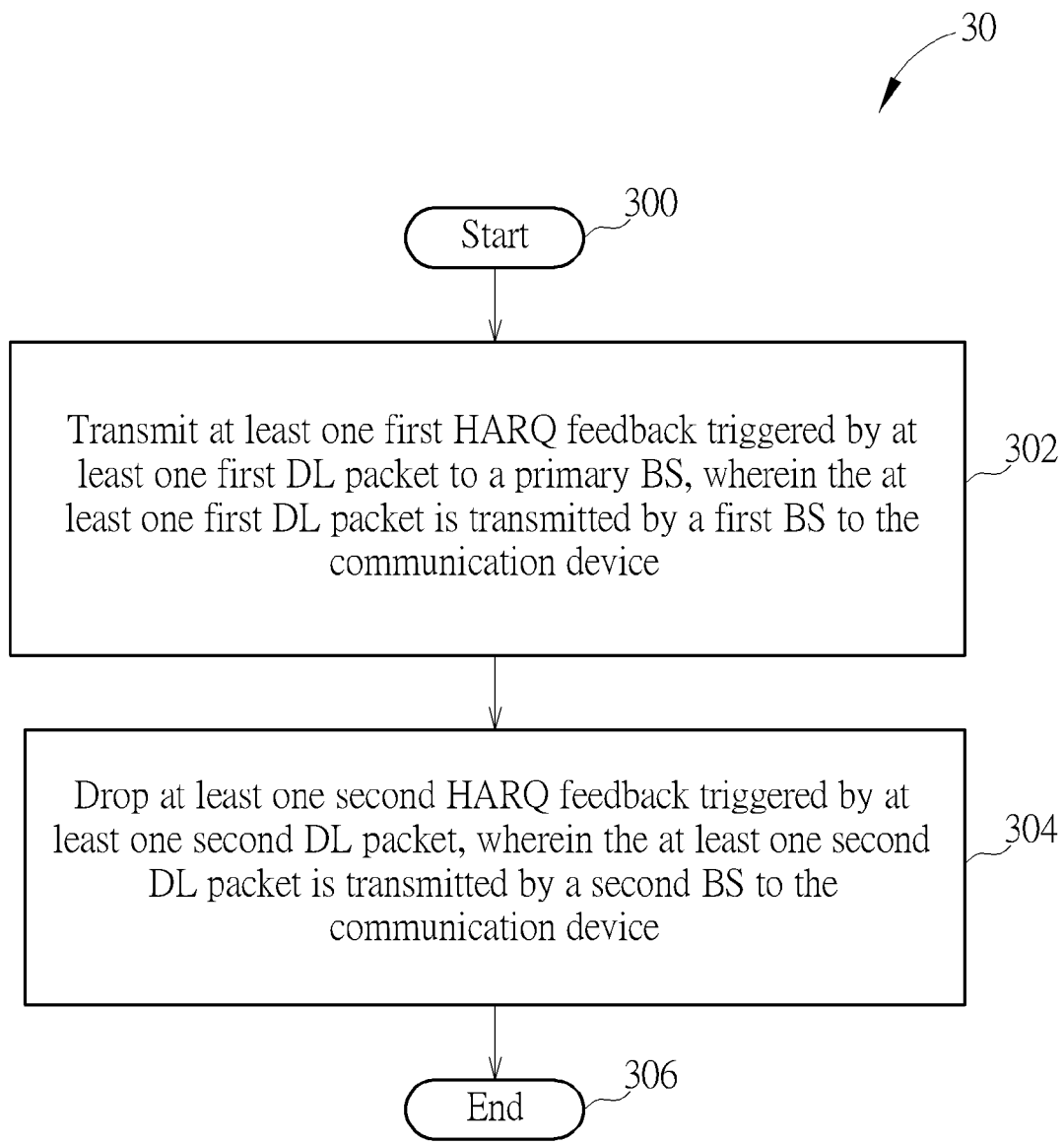
FIG. 3 is a flowchart of a process according to an example of the present invention.

FIG. 3 is a flowchart of a process 30 according to an example of the present invention. The process 30 may be utilized in a communication device, for transmitting HARQ feedbacks. The process 30 may be compiled into the program code 214 and includes the following steps:

Step 300: Start.

Step 302: Transmit at least one first HARQ feedback triggered by at least one first DL packet to a primary BS, wherein the at least one first DL packet is transmitted by a first BS to the communication device.

Step 304: Drop at least one second HARQ feedback triggered by at least one second DL packet, wherein the at least one second DL packet is transmitted by a second BS to the communication device.

Step 306: End.

According to the process 30, the communication device (e.g., the UE 100) transmits at least one first HARQ feedback triggered by at least one first DL packet to a primary BS, wherein the at least one first DL packet is transmitted by a first BS (e.g., the BS 102) to the communication device. In addition, the communication device drops at least one second HARQ feedback triggered by at least one second DL packet, wherein the at least one second DL packet is transmitted by a second BS (e.g., the BS 104) to the communication device. That is, the at least one first HARQ feedback may be transmitted, while the at least one second HARQ feedback may be dropped. According to the behavior of the communication device, the communication device may be configured to transmit the at least one HARQ feedback according to a physical UL control channel (PUCCH) format 1a, 1b or 3 (e.g., configured with the dual connectivity) for transmitting the at least one first HARQ feedback.

For example, the primary BS may be the first BS, e.g., a primary cell of the communication device is controlled by the first BS. In this situation, the at least one first HARQ feedback may be transmitted to the primary BS (i.e., the first BS) according to a function of a location of DL control information (DCI) indicating the at least one first DL packet. That is, PUCCH resource(s) for transmitting the at least one first HARQ feedback is determined according to the function of the location of the DCI. In another example, the at least one first HARQ feedback may be transmitted to the primary BS according to an indication in DCI indicating the at least one first DL packet and/or a function of a location of the DCI. That is, PUCCH resource(s) for transmitting the at least one first HARQ feedback is determined according to the indication in the DCI and/or the function of the location of the DCI. Preferably, the indication may be in a transmit power control (TPC) field of the DCI, and is not limited herein. That is, in the above examples, the HARQ feedback(s) for the first BS is transmitted to the first BS, while the HARQ feedback (s) for the second BS is dropped. In other words, the first BS which controls the primary cell is able to receive its HARQ feedback (s), while the HARQ feedback (s) of the second BS is dropped by the communication device. The second BS may consider the dropped HARQ feedback (s) as positive acknowledgement (s) (ACK(s)). In this situation, reliability of the communication between the communication device and the second BS may be maintained by a higher layer protocol, e.g., ARQ protocol.

In another example, the primary BS may be the second BS, e.g., a primary cell of the communication device is controlled by the second BS. In this situation, the at least one first HARQ feedback may be transmitted to the primary BS (i.e., the second BS) according to a higher layer configuration. That is, in the present example, the HARQ feedback (s) for the first BS is transmitted to the second BS, while the HARQ feedback (s) for the second BS is dropped. Different from the previous example, the second BS which controls the primary cell is able to receive the HARQ feedback (s) of the first BS, while its HARQ feedback (s) is dropped by the communication device. Then, the second BS may forward the received HARQ feedback (s) to the first BS, e.g., via an X2 interface. The second BS may consider the dropped HARQ feedback (s) as ACK (s). In this situation, reliability of the communication between the communication device and the second BS may be maintained by a higher layer protocol, e.g., ARQ protocol. Which one of the above examples should be realized can be determined according to a higher layer configuration.

Thus, the primary BS can easily detect the HARQ feedback (s) transmitted by the communication device according to a predetermined rule described above. The problem in the art that the primary BS cannot handle the HARQ feedback (s) properly is solved.

Figure 4:
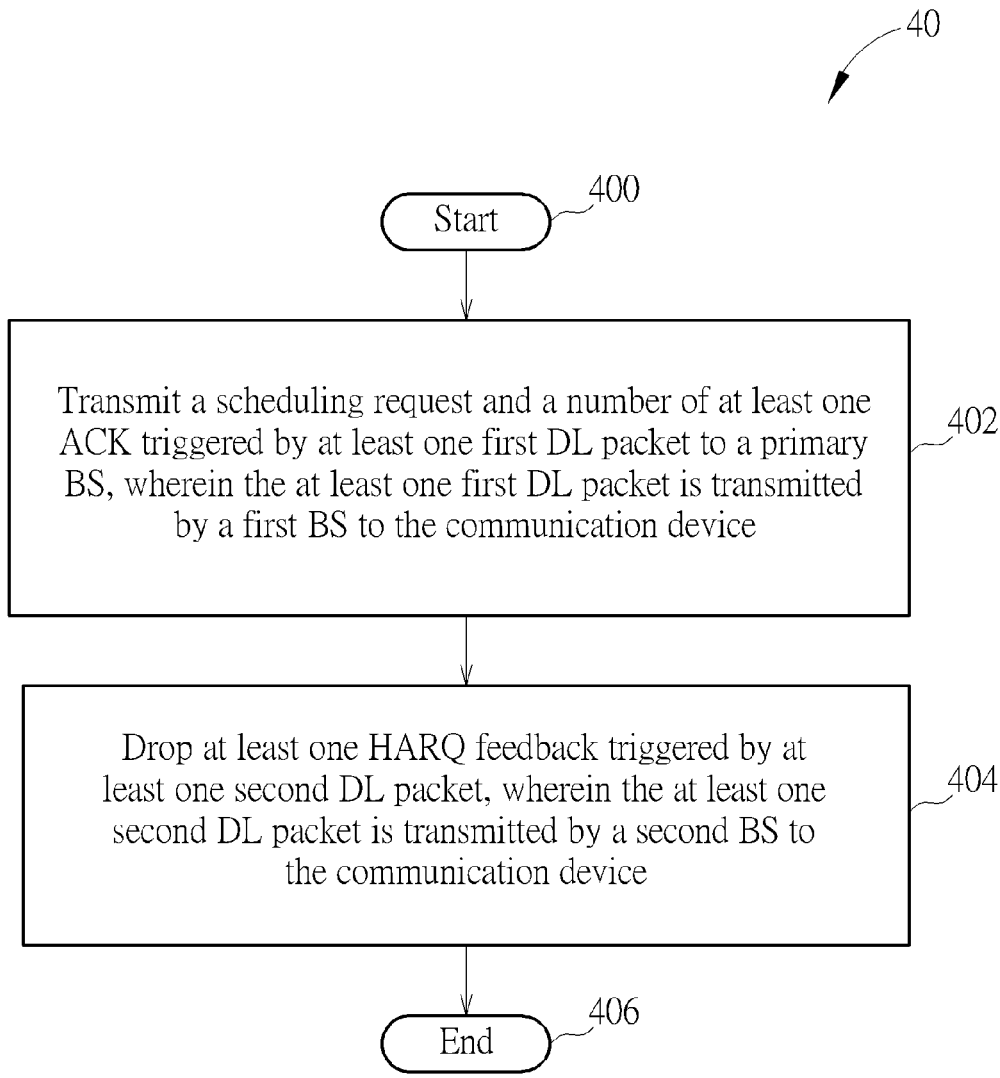
FIG. 4 is a flowchart of a process according to an example of the present invention.

FIG. 4 is a flowchart of a process 40 according to an example of the present invention. The process 40 may be utilized in a communication device, for transmitting ACKs. The process 40 may be compiled into the program code 214 and includes the following steps:

Step 400: Start.

Step 402: Transmit a scheduling request and a number of at least one ACK triggered by at least one first DL packet to a primary BS, wherein the at least one first DL packet is transmitted by a first BS to the communication device.

Step 404: Drop at least one HARQ feedback triggered by at least one second DL packet, wherein the at least one second DL packet is transmitted by a second BS to the communication device.

Step 406: End.

According to the process 40, the communication device (e.g., the UE 100) may transmit a scheduling request (SR) and a number of at least one ACK triggered by at least one first DL packet to a primary BS, wherein the at least one first DL packet is transmitted by a first BS (e.g., the BS 102) to the communication device. Note that the number of the at least one ACK may be zero. In addition, the communication device drops at least one HARQ feedback triggered by at least one second DL packet, wherein the at least one second DL packet is transmitted by a second BS (e.g., the BS 104) to the communication device. That is, the SR may be transmitted with the number of the at least one ACK (e.g., 4), while the at least one HARQ feedback triggered by the at least one second DL packet may be dropped. According to the behavior of the communication device, the communication device may be configured with a PUCCH format 1b with channel selection (e.g., configured with the dual connectivity) for transmitting the number of ACK(s).

For example, the primary BS may be the first BS, e.g., a primary cell of the communication device is controlled by the first BS. That is, the SR (e.g., for the first BS and/or the second BS) and the number of the HARQ feedback (s) for the first BS is transmitted to the first BS, while the number of the HARQ feedback (s) for the second BS is dropped. The second BS may consider HARQ feedback (s) corresponding to the dropped number of HARQ feedback (s) as ACK (s). In this situation, reliability of the communication between the communication device and the second BS may be maintained by a higher layer protocol, e.g., ARQ protocol.

In another example, the primary BS may be the second BS, e.g., a primary cell of the communication device is controlled by the second BS. That is, the SR (e.g., for the first BS and/or the second BS) and the number of the HARQ feedback (s) for the first BS is transmitted to the second BS, while the number of the HARQ feedback (s) for the second BS is dropped. The second BS may consider HARQ feedback (s) corresponding to the dropped number of HARQ feedback (s) as ACK (s). In this situation, reliability of the communication between the communication device and the second BS may be maintained by a higher layer protocol, e.g., ARQ protocol.

Thus, the primary BS can easily detect the SR with the number of the HARQ feedback (s) transmitted by the communication device according to a predetermined rule described above. The problem in the art that the primary BS cannot handle the SR and the HARQ feedback (s) properly is solved.

Figure 5:
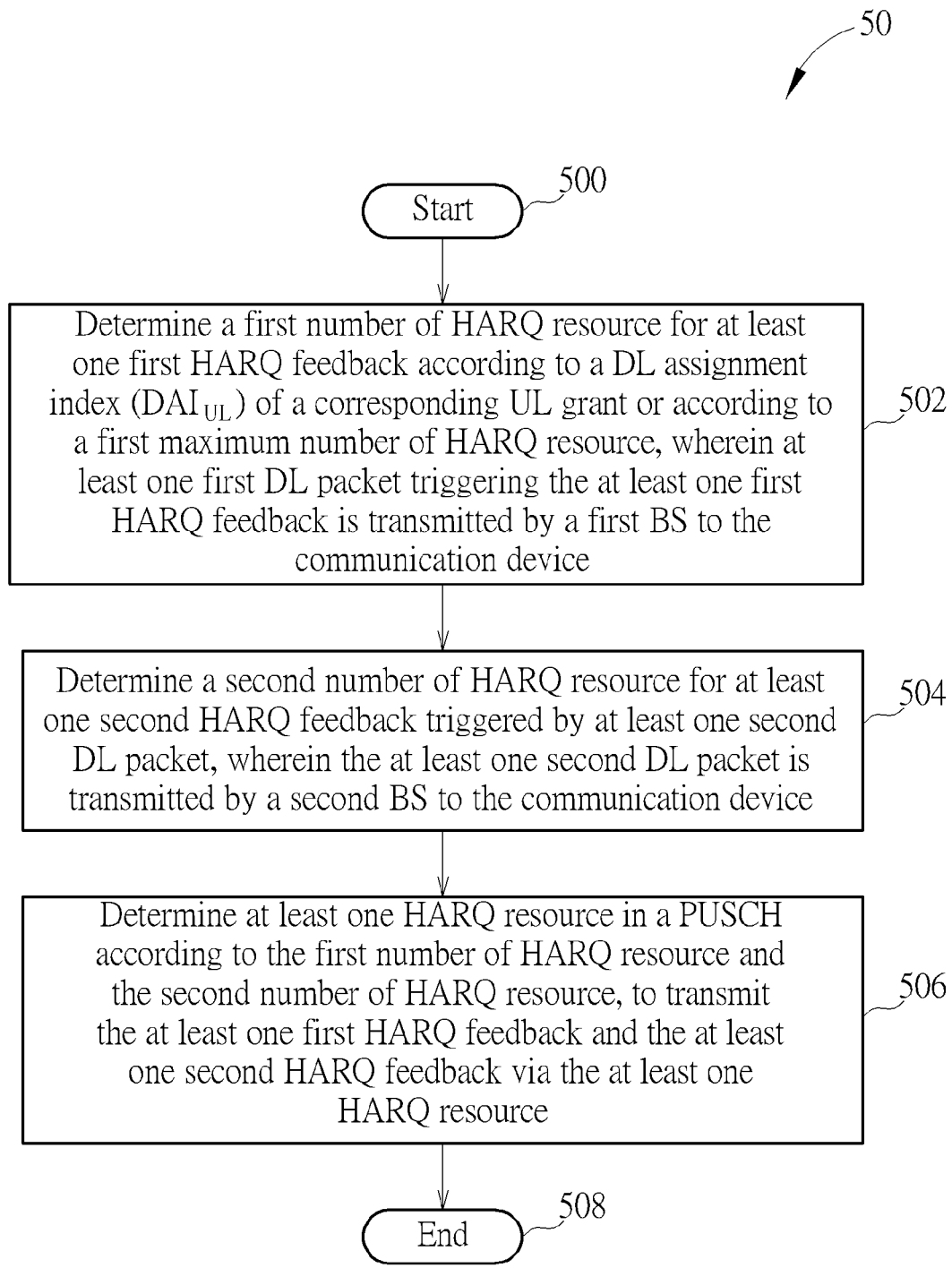
FIG. 5 is a flowchart of a process according to an example of the present invention.

FIG. 5 is a flowchart of a process 50 according to an example of the present invention. The process 50 may be utilized in a communication device, for transmitting HARQ feedbacks. The process 50 may be compiled into the program code 214 and includes the following steps:

Step 500: Start.

Step 502: Determine a first number of HARQ resource for at least one first HARQ feedback according to a DL assignment index ($DAI_{UL}$) of a corresponding UL grant or according to a first maximum number of HARQ resource, wherein at least one first DL packet triggering the at least one first HARQ feedback is transmitted by a first BS to the communication device.

Step 504: Determine a second number of HARQ resource for at least one second HARQ feedback triggered by at least one second DL packet, wherein the at least one second DL packet is transmitted by a second BS to the communication device.

Step 506: Determine at least one HARQ resource in a PUSCH according to the first number of HARQ resource and the second number of HARQ resource, to transmit the at least one first HARQ feedback and the at least one second HARQ feedback via the at least one HARQ resource.

Step 508: End.

According to the process 50, the communication device (e.g., the UE 100) determines a first number of HARQ resource (e.g., 2) for at least one first HARQ feedback according to a $DAI_{UL}$ of a corresponding UL grant or according to a first maximum number of HARQ resource (e.g., 4 for TDD UL/DL configuration 4 in 3GPP LTE), wherein at least one first DL packet triggering the at least one first HARQ feedback is transmitted by a first BS (e.g., the BS 102) to the communication device. In addition, the communication device determines a second number of HARQ resource (e.g., 1 for TDD UL/DL configuration 6 in 3GPP LTE) for at least one second HARQ feedback triggered by at least one second DL packet, wherein the at least one second DL packet is transmitted by a second BS (e.g., the BS 104) to the communication device. Then, the communication device determines at least one HARQ resource in a PUSCH according to the first number of HARQ resource and the second number of HARQ resource, to transmit the at least one first HARQ feedback and the at least one second HARQ feedback via the at least one HARQ resource. Preferably, the first number of HARQ resource may be determined according to the $DAI_{UL}$, if the $DAI_{UL}$ exists. The first number of HARQ resource may be determined according to the first maximum number of HARQ resource, if the $DAI_{UL}$ does not exist.

A method according to which the second number of HARQ resource in the process 50 is determined is not limited. For example, the second number of HARQ resource may be determined according to a second maximum number of HARQ resource and a transmission scheme operated between the second BS and the communication device (e.g., 8, if the TDD UL/DL configuration is 4 and the corresponding transmission scheme is spatial multiplexing). The transmission scheme may be related to a way according to which the communication device processes a PDSCH, e.g., a number of transmission blocks (TBs) (e.g., 2) received in the PDSCH. The transmission scheme may include single antenna port transmission, transmission diversity, spatial multiplexing, etc., and is not limited herein. In another example, the second number of HARQ resource may be determined according to a predetermined number of HARQ resource (e.g., performed by logical "AND" operation among at least one HARQ feedback) and a transmission scheme operated between the second BS and the communication device (e.g., 1, if the TDD UL/DL configuration is 4 and the corresponding transmission scheme is single antenna port transmission; 2, if the TDD UL/DL configuration is 4 and the corresponding transmission scheme is spatial multiplexing). In another example, the second number of HARQ resource may be determined to be zero, i.e., the at least one second HARQ feedback is dropped. The second BS may consider the dropped HARQ feedback(s) as ACK (s). In this situation, reliability of the communication between the communication device and the second BS may be maintained by a higher layer protocol, e.g., ARQ protocol.

Thus, the communication device can transmit the HARQ feedback (s) via the PUSCH according to a predetermined rule described above. The problem in the art that the communication device cannot handle the HARQ feedback (s) to be transmitted on the PUSCH is solved.

Figure 6:
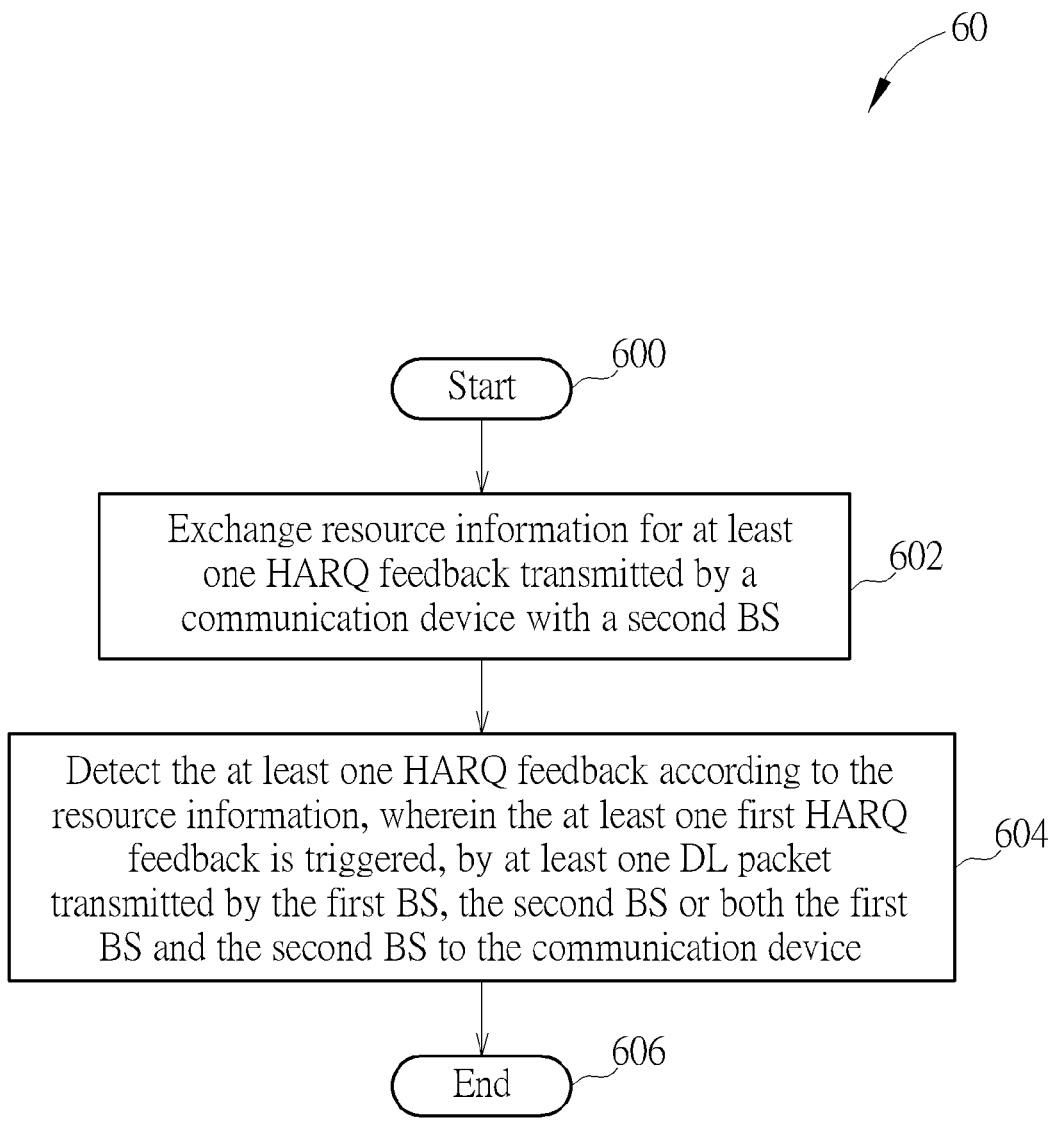
FIG. 6 is a flowchart of a process according to an example of the present invention.

FIG. 6 is a flowchart of a process 60 according to an example of the present invention. The process 60 may be utilized in a first BS (e.g., the BS 102), for receiving HARQ feedbacks. The process 60 may be compiled into the program code 214 and includes the following steps:

Step 600: Start.

Step 602: Exchange resource information for at least one HARQ feedback transmitted by a communication device with a second BS.

Step 604: Detect the at least one HARQ feedback according to the resource information, wherein the at least one first HARQ feedback is triggered, by at least one DL packet transmitted by the first BS, the second BS or both the first BS and the second BS to the communication device.

Step 606: End.

According to the process 60, the first BS exchanges resource information for at least one HARQ feedback transmitted by a communication device (e.g., the UE 100) with a second BS (e.g., the BS 104). In addition, the first BS detects the at least one HARQ feedback according to the resource information. The at least one first HARQ feedback may be triggered by at least one DL packet transmitted by the first BS, the second BS or both the first BS and the second BS to the communication device. Preferably, a primary cell of the communication device may be controlled by the first BS. According to the behavior of the communication device, the communication device may be configured to transmit the at least one HARQ feedback according to a PUCCH format 1a, 1b or 3 (e.g., configured with the dual connectivity). For example, the communication device may use the PUCCH format 1a or 1b for transmitting the HARQ feedback(s), if the communication device is configured with the PUCCH format 1b with channel selection (e.g., configured with the dual connectivity). For another example, the communication device may use the PUCCH format 3 for transmitting the HARQ feedback (s), if the communication device is configured with the PUCCH format 3.

In other words, the first BS may negotiate the resource information related to the reception of the at least one HARQ feedback with the second BS, because the communication device may communicate with the first BS and the second BS simultaneously according to the dual connectivity and part of the HARQ feedback (s) may belong to the second BS. Thus, the first BS can easily detect the HARQ feedback (s) transmitted by the communication device according to the resource information. The problem that resource index which is used for determining resources for transmitting the HARQ feedback (s) cannot be synchronized between the first BS and the second BS is solved.

Realization of the present invention is not limited to the above description.

The resource information in the process 60 may include a set of an identification of the communication device, a plurality of resource indices, and a plurality of subframe index groups which correspond to the plurality of resource indices, respectively. Accordingly, the first BS may detect the at least one HARQ feedback in the process 60 according to the resource information according to the following description. It is assumed that the communication device is configured with one of the plurality of resource indices. First, the first BS receives the at least one HARQ feedback via a resource in a subframe. Then, the first BS determines that the at least one HARQ feedback is transmitted by the communication device according to the identification of the communication device, if the resource is indicated by the one of the plurality of resource indices and the subframe indicated by one of the plurality of subframe index groups corresponding to the one of the plurality of resource indices.

For example, let the plurality of resource indices be {#a, #b, #c, #d}, wherein each of the plurality of resource indices corresponds to a specific resource (e.g., resource group). In addition, let the plurality of subframe index groups be {1111000000, 0000111000, 0000000111, 0000000000}, which correspond to the plurality of resource indices {#a, #b, #c, #d}, respectively. For example, the resource index "#a" corresponds to the subframe index group "1111000000", and the resource index "#b" corresponds to the subframe index group "0000111000". Each of the subframe index groups includes a bit map for 10 subframes, and a bit "1" indicates a reception of HARQ feedback (s) may happen in a corresponding subframe. For example, for the subframe index group "1111000000", HARQ feedback (s) may happen in subframes 0, 1, 2 and/or 3. Assuming that the communication device is configured with the resource index "#a" with the corresponding subframe index group "1111000000", the first BS determines received HARQ feedback(s) is transmitted by the communication device, if the HARQ feedback(s) is received in the resource index #a of the subframe 0, 1, 2 and/or 3. That is, the first BS can uniquely determine which communication device transmits the HARQ feedback(s) in a specific resource, if the resource index with the corresponding subframe index group for the specific resource is assigned to a communication device.

It should be noted that the plurality of resource indices, the plurality of subframe index groups and the correspondence therebetween may be stored in the communication device, such that the communication device may determine the resource indices (and thus the resources) for transmitting the HARQ feedback(s). In this situation, the second BS does not need to exchange resource information (i.e., backhaul information) with the first BS.

Furthermore, considering the communication device in the previous description as the first communication device, the first BS exchanges another resource information for another HARQ feedback (s) transmitted by a second communication device (not shown in FIG. 1) with the second BS, and detecting the second HARQ feedback(s) according to the resource information. Similarly, the resource information may include a set of an identification of the second communication device, a plurality of resource indices, and a plurality of subframe index groups which correspond to the plurality of resource indices, respectively. For example, let the plurality of resource indices be {#a, #b, #c, #d}, wherein each of the plurality of resource indices corresponds to a specific resource (e.g., resource group). In addition, let the plurality of subframe index groups be {0000111100, 0001000011, 1110000000, 0000000000}, which correspond to the plurality of resource indices {#a, #b, #c, #d}, respectively. As can be seen, for a same resource index, the subframe index group of the second communication device can be distinguished from the subframe index group of the first communication device. That is, the HARQ feedback(s) is transmitted by the second communication device in another resource in the subframe, if the HARQ feedback (s) of the first communication device is also scheduled in the subframe according to the resource information of the first communication device. Thus, the first BS can uniquely recognize the HARQ feedback(s) transmitted in a specific resource.

Figure 7:
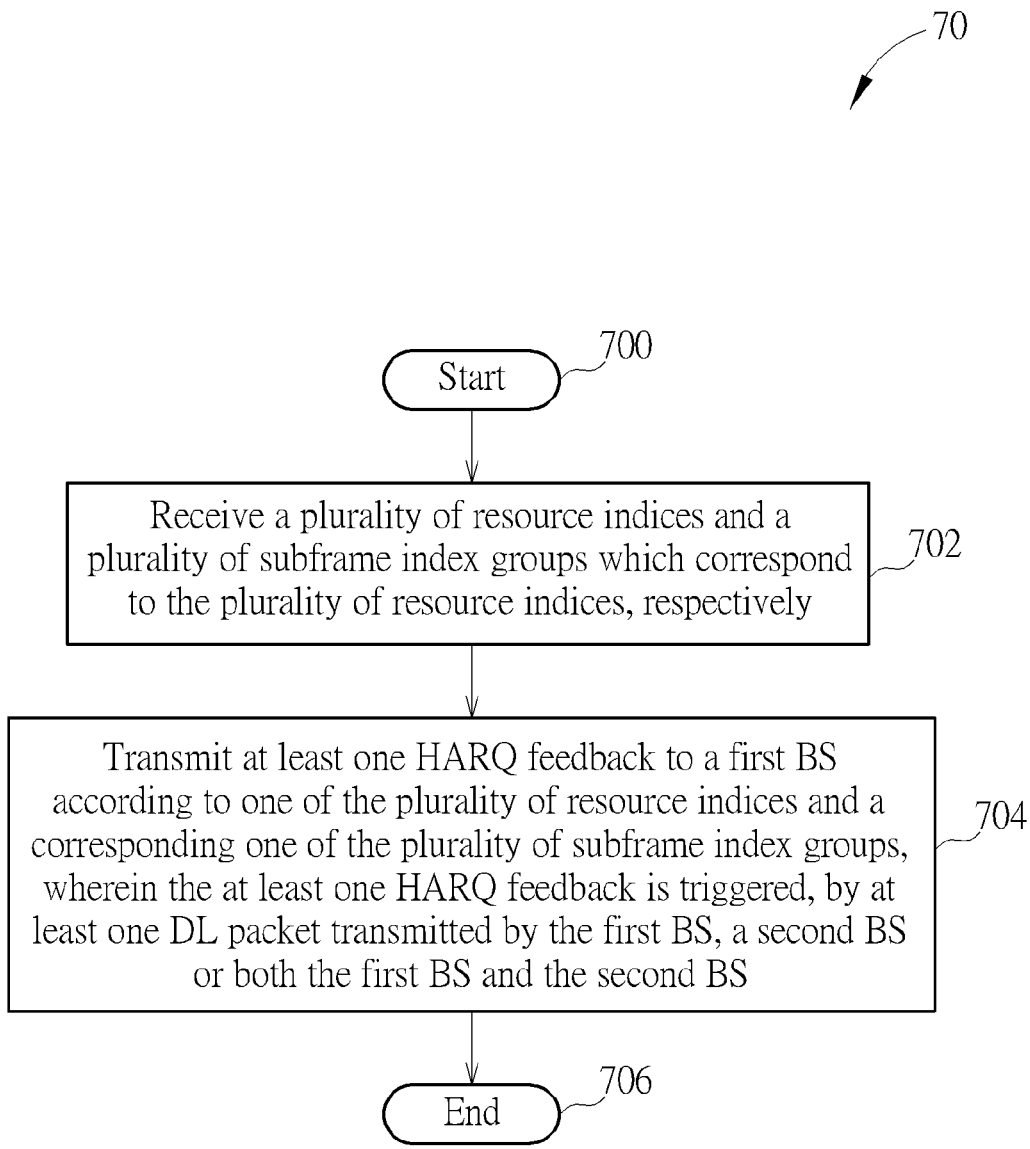
FIG. 7 is a flowchart of a process according to an example of the present invention.

The operation of the communication device in the above description can be summarized into a process 70 shown in FIG. 7. The process 70 may be compiled into the program code 214 and includes the following steps:

Step 700: Start.

Step 702: Receive a plurality of resource indices and a plurality of subframe index groups which correspond to the plurality of resource indices, respectively.

Step 704: Transmit at least one HARQ feedback to a first BS according to one of the plurality of resource indices and a corresponding one of the plurality of subframe index groups, wherein the at least one HARQ feedback is triggered, by at least one DL packet transmitted by the first BS, a second BS or both the first BS and the second BS.

Step 706: End.

Detailed operations of the process 70 can be referred to the above illustration. According to an example illustrated above, the communication device may be configured with the resource index "#a" among the resource indices, and the resource index "#a" correspond to the subframe index group "1111000000". Then, the communication device can transmit the HARQ feedback(s) according to the resource index "#a" and the corresponding subframe index group "1111000000", the HARQ feedback(s) which may be triggered by at least one DL packet transmitted by the first BS, a second BS or both the first BS and the second BS.

It should be noted that a HARQ resource mentioned above is not limited to a bit, a resource element (RE), a resource block (RB) or a resource block group (RBG), but can be referred to one or more bits, REs, RBs or RBGs, and is not limited herein.

Those skilled in the art should readily make combinations, modifications and/or alterations on the abovementioned description and examples. The abovementioned steps of the processes including suggested steps can be realized by means that could be a hardware, a firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include a system on chip (SOC), system in package (SIP), a computer on module (COM), and the communication device 20.

To sum up, the present invention provides a method of handling HARQ feedbacks. The problem in the art that a BS cannot handle the HARQ feedback (s) for multiple BSs, e.g., provides the HARQ feedback (s) to another BS immediately, is solved. Thus, the BSs and the communication device can operate regularly without being affected by the missed or delayed HARQ feedback(s).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of transmitting hybrid automatic repeat request (HARQ) feedbacks for a communication device, the method comprising:
    transmitting at least one first HARQ feedback triggered by at least one first downlink (DL) packet to a primary base station, wherein the at least one first DL packet is transmitted by a first base station to the communication device; and
    dropping at least one second HARQ feedback triggered by at least one second DL packet, wherein the at least one second DL packet is transmitted by a second base station to the communication device and the dropping of the at least one second HARQ feedback is considered as at least one positive acknowledgement (ACK).

2. The method of claim 1, wherein the primary base station is the first base station.

3. The method of claim 2, wherein the at least one first HARQ feedback is transmitted to the primary base station according to a function of a location of DL control information (DCI) indicating the at least one first DL packet.

4. The method of claim 2, wherein the at least one first HARQ feedback is transmitted to the primary base station according to an indication in DCI indicating the at least one first DL packet and/or a function of a location of the DCI.

5. The method of claim 4, wherein the indication is in a transmit power control (TPC) field of the DCI.

6. The method of claim 1, wherein the primary base station is the second base station.

7. The method of claim 6, wherein the at least one first HARQ feedback is transmitted to the primary base station according to a higher layer configuration.

8. The method of claim 1, wherein the communication device is configured to transmit the at least one first HARQ feedback according to a physical uplink (UL) control channel (PUCCH) format 1a, 1b or 3.

9. The method of claim 1, wherein a primary cell of the communication device is controlled by the primary base station.

10. The method of claim 1, wherein the communication device transmits the at least one first HARQ feedback by transmitting a number of at least one positive acknowledgement (ACK) of the at least one first HARQ feedback.

11. The method of claim 10, wherein the communication device transmits a scheduling request with the number of at least one ACK to the primary base station.

* * * * *